(12) United States Patent
Sickart (10) Patent No.: US 8,186,241 B2
(45) Date of Patent: May 29, 2012

(54) SHIFTING DEVICE FOR AN AUTOMATIC TRANSMISSION

(75) Inventor: Michael Sickart, Heimsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 518 days.

(21) Appl. No.: 12/432,104

(22) Filed: Apr. 29, 2009

(65) Prior Publication Data

US 2010/0107799 A1    May 6, 2010

(30) Foreign Application Priority Data

Apr. 30, 2008  (DE) .......................... 10 2008 022 550

(51) Int. Cl.
*B60K 20/00* (2006.01)
*G05G 5/08* (2006.01)

(52) U.S. Cl. .................. 74/473.21; 74/473.23; 74/473.3

(58) Field of Classification Search ................ 74/473.1, 74/473.12, 473.21, 473.22, 473.23, 473.24, 74/473.25, 473.26, 473.3

See application file for complete search history.

(56) References Cited

U.S. PATENT DOCUMENTS

| | | | | |
|---|---|---|---|---|
| 4,398,433 | A * | 8/1983 | Sonns ........................ | 74/473.21 |
| 4,612,820 | A | 9/1986 | Behrens | |
| 5,465,818 | A * | 11/1995 | Osborn et al. ............. | 192/220.4 |
| 6,431,339 | B1 * | 8/2002 | Beattie et al. ............. | 192/220.4 |
| 7,913,583 | B2 * | 3/2011 | Reppuhn et al. ........... | 74/473.24 |
| 2004/0244524 | A1* | 12/2004 | Russell ...................... | 74/473.23 |
| 2006/0272441 | A1* | 12/2006 | Kamei et al. .............. | 74/473.21 |
| 2008/0072698 | A1* | 3/2008 | Hirano ....................... | 74/473.21 |
| 2010/0107798 | A1* | 5/2010 | Sickart ....................... | 74/473.18 |
| 2010/0107800 | A1* | 5/2010 | Sickart ....................... | 74/473.23 |

FOREIGN PATENT DOCUMENTS

| | | |
|---|---|---|
| DE | 2 250 985 | 4/1974 |
| DE | 37 17 675 C2 | 12/1988 |
| DE | 39 27 922 A1 | 3/1991 |
| DE | 195 06 766 C1 | 2/1996 |
| DE | 196 01 442 C2 | 2/1998 |
| DE | 197 37 366 A1 | 3/1998 |
| DE | 199 13 835 A1 | 9/2000 |
| DE | 199 38 528 A1 | 2/2001 |
| DE | 694 25 755 T2 | 4/2001 |
| DE | 100 57 299 A1 | 7/2001 |
| DE | 100 21 461 C1 | 10/2002 |
| DE | 197 28 064 B4 | 5/2006 |
| DE | 101 46 776 B4 | 10/2006 |
| DE | 10 2006 016 780 A1 | 10/2007 |
| WO | WO 2005/025916 A1 | 3/2005 |

* cited by examiner

*Primary Examiner* — Justin Krause
*Assistant Examiner* — Adam D Rogers
(74) *Attorney, Agent, or Firm* — RatnerPrestia (57) ABSTRACT

A shifting device for an automatic transmission of a motor vehicle with a gear-shift lever, which can be moved in an automatic shift track to select gear-shift positions; with a locking mechanism for blocking the adjusting movements of the gear-shift lever into at least one gear-shift position and/or out of at least one gear-shift position; and with a release button arranged on the gear-shift lever to release the blocking action of the locking mechanism. An increased level of functional reliability can be achieved by establishing a drive connection between the release button and two blocking elements, which are arranged redundantly on the gear-shift lever with the freedom to move up and down, that an actuation of the release button produces a synchronous stroke of the two blocking elements, where each of the blocking elements cooperates with an arresting gate comprising gate sections assigned to the gear-shift positions.

9 Claims, 8 Drawing Sheets

SHIFTING DEVICE FOR AN AUTOMATIC TRANSMISSION

CROSS REFERENCE TO RELATED APPLICATIONS

This U.S. patent application claims priority to German Application DE 10 2008 022 550.9, filed Apr. 30, 2008, which is incorporated by reference herein in its entirety.

FIELD OF THE INVENTION

The present invention pertains to a shifting device for an automatic transmission of a motor vehicle.

BACKGROUND OF THE INVENTION

A shifting device for an automatic transmission of a motor vehicle which comprises a gear-shift lever, which can be moved in an automatic shift track to select gear-shift positions, is known from DE 100 57 299 A1. This automatic shift track can comprise, for example, gear-shift positions for Park, Reverse, Neutral, and Drive. The known shifting device also comprises a locking mechanism, which can be switched at least between a locked state and a released state. It also comprises a release button for changing the state of the locking mechanism. In the locked state, the locking mechanism blocks the movement of the gear-shift lever at least into the Park and Reverse positions and at least out of the Park position. In the released state, the locking mechanism allows the gear-shift lever to be moved at least between Park, Reverse, Neutral, and Drive.

The known shifting device also comprises a manual shift track, in which the gear-shift lever can be moved between a middle position, an upshift position, and a downshift position. A transverse shift track is also provided so that the gear-shift lever can be switched between the automatic shift track and the manual shift track.

DE 199 13 835 A1 describes another shifting device, the locking mechanism of which comprises an arresting gate with gate sections assigned to the individual shift positions, into which sections a blocking element, which can be actuated by the release button, can engage. A pivot gate is provided at an offset from the arresting gate. The blocking element can be moved into this pivot gate from the neutral shift position by actuating the release button with greater force. This makes it possible to pivot the gear-shift lever into a horizontal rest position. As a result, the gear-shift lever can be accommodated in a very small space, which is desirable in cases where the space in which the shifting device is located is used, for example, as a passageway between a cockpit and a sleeping cabin.

DE 100 21 461 C1 shows a shifting device with a blocking mechanism for blocking the gear-shift lever in Park and Neutral. For this purpose, the blocking mechanism comprises two separate locking elements, which cooperate with a common blocking gate. One of the locking elements engages in the blocking gate to block the Park position, whereas the other locking element engages in the blocking gate to block the Neutral position.

DE 197 28 064 B4 shows another shifting device with a blocking mechanism, by means of which the gear-shift lever can be blocked in Park. For this purpose, a blocking element is provided, which can engage in an arresting gate, which comprises gate sections assigned to the gear-shift positions of the gear-shift lever. A blocking element connected to the gear-shift lever works together with the arresting gate. When the gear-shift lever is in Park, the blocking element on the gear-shift lever side is engaged in the associated section of the gate. To block the Park position, the blocking element of the blocking mechanism now also engages in the arresting gate in such a way that the blocking element on the gear-shift lever side can no longer be moved out of the section of the gate assigned to Park.

A shifting device for a tractor by means of which two gear ratios of a gearbox can be selected is known from U.S. Pat. No. 4,398,433. At the bottom of a shifting knob, the gear-shift lever comprises two short stops and one long stop, which project into a gate. The gate comprises a first gate section for the first shifting stage, a second gate section for the second shifting stage, and a central, third gate section assigned to a neutral position, located between the two first-mentioned gate sections. The short stops make it possible to block the gear-shift lever in the gear-shift positions assigned to the two gear ratios and in the position assigned to neutral. The long stop realizes end stops for the adjusting movement of the gear-shift lever in the first gate section and also in the second gate section. By pulling the gear-shift lever out, the short stops come free of the gate and make it possible, for example, to move the gear-shift lever out of the gear-shift position assigned to one of the two gear ratios. It can then be pushed into the neutral position. The long stop guarantees here that, with the help of an end stop, the neutral position will be found. By pulling the gear-shift lever out even farther, the long stop will also come free of the gate, so that it is possible to rotate the shifting knob 180° around its longitudinal axis. As a result, the long stop can be moved over from the first gate section to the second gate section. After that, the gear-shift lever can be moved in the second gate section, which is assigned to the second gear ratio.

DE 101 46 776 B4 describes a shifting device in which the gear-shift lever can be moved to various positions in a two-dimensional shift gate. To block the gear-shift lever in Park and Reverse, locking elements are provided, which engage directly in the shift gate and cooperate directly with the gear-shift lever.

WO 2005/025916 A1 describes a shifting device with a blocking mechanism which comprises a latching cone, which engages in a recess assigned to the Park position, this recess being formed in a segment disk, which moves concomitantly with the gear-shift lever. The latching lever has a latching projection and two parallel side pieces.

SUMMARY OF THE INVENTION

The present invention deals with the problem of providing, for a shifting device of the type indicated above, an improved or at least a different embodiment, which is characterized in particular in that it realizes improved shifting convenience or actuation convenience and/or that it has increased stability and/or that it comprises a higher level of failure safety.

The invention relates to the general idea of realizing a drive connection between the release button and two blocking elements, where the blocking elements are arranged on the gear-shift lever with freedom to move up and down, and where the blocking elements are also arranged in redundant fashion. The two blocking elements are arranged in such a way that an actuation of the release button produces a synchronous stroke of the two blocking elements. Each of the blocking elements cooperates with an arresting gate, which comprises gate sections assigned to the gear-shift positions. In the gear-shift position in question, each blocking element cooperates with its associated gate section to prevent the gear-shift lever from moving out of the locked state. The stroke of the blocking element which occurs when the release button is actuated has the effect of disengaging the blocking element from the gate section in question and allows the gear-shift lever to be moved into a new position. As a result of this actuation of the release button, the locking mechanism is converted to a released state. The redundant design of the blocking element based on the provision of two synchronously operating or synchronously acting blocking elements reduces the mechanical load on the individual blocking element; in particular, it cuts that load in half, which prolongs the service life of the shifting device. If one of the blocking elements fails, furthermore, a fallback position exists, because the other blocking element remains functional. Overall, the shifting device thus offers a higher degree of failure safety.

In an alternative solution of this problem, the invention relates to the idea of equipping a blocking mechanism for blocking the gear-shift lever in the Park position with two redundantly arranged blocking elements, each of which cooperates with a blocking gate. The blocking gate comprises a gate section assigned to the Park position. The two blocking elements and the minimum of one blocking gate are coordinated with each other in such a way that, when the Park position is present, each blocking element is aligned with the assigned gate section and can engage therein, thus producing the blocking effect. The blocking mechanism is provided in addition to the locking mechanism and can, under certain conditions, block the gear-shift lever in the Park position, so that it cannot be moved out of the Park position even when the release button is used to convert the locking mechanism into its released state. For example, the blocking mechanism can be connected to an ignition lock of the vehicle, so that the blocking action is released only when the ignition key is inserted. It can also be provided that, in addition, a brake pedal of the vehicle must be actuated to release the blocking action. An embodiment of this type, which is also called a "shift lock", reduces the risk of incorrect operation of the shifting device. It forms in particular a child safety device, which makes it more difficult for children playing in the vehicle to cause the vehicle to roll away unintentionally. According to aspects of the invention, two redundantly arranged blocking elements are provided, as a result of which the load on the individual blocking element is reduced and the service life of the shifting device is prolonged. In addition, the redundant arrangement of the blocking elements increases the failure safety of the shifting device, because the function of the blocking mechanism can remain guaranteed even if one of the blocking elements should fail.

According to an advantageous embodiment, two arresting gates can be provided, where each of the two blocking elements cooperates with one of these arresting gates. As a result, the load on the individual arresting gate is reduced, which increases the service life and the failure safety of the shifting device.

According to an especially advantageous embodiment, the two arresting gates can be formed in a common component, namely, in such a way that the gate sections of the two arresting gates merge continuously with each other. As a result, an especially compact design is realized in spite of the redundant arrangement of the arresting gates and the redundant arrangement of the blocking elements.

The shifting device presented here is especially suitable for use in conjunction with a dual-clutch automatic transmission. A dual-clutch automatic transmission of this type makes it possible to shift extremely quickly from one gear to the next. The proposed shifting device offers the possibility of exploiting this property of the dual-clutch transmission in an especially effective manner. In particular, dynamic shifting operations can be realized in the automatic shift track when maneuvering or when the automatic transmission is actuated in the manual shift track. Dynamic shifting operations or dynamic actuating operations which are possible with such a dual-clutch transmission require an especially sturdy shifting device, which can be subjected to high loads. The proposed shifting device has the desired high degree of sturdiness and operating reliability. The dual-clutch automatic transmission can be designed in an especially advantageous manner as a seven-gear automatic transmission, which comprises seven forward gears. In addition, the shifting device presented here is especially suitable for use in sports vehicles or in a vehicles with a rear-mounted engine. Dynamic shifting operations are frequently desired precisely in the case of sports vehicles, especially those with a rear-mounted engine. As a result of higher degree of actuation convenience and its increased reliability, the sturdy shifting device presented here makes such dynamic shifting operations possible.

Other important features and advantages of the invention can be derived from the drawings, and from the associated description of the figures on the basis of the drawings.

It should be obvious that the features cited above and to be explained below are applicable not only in the combinations specifically stated but also in other combinations or even alone without leaving the scope of the present invention.

BRIEF DESCRIPTION OF THE DRAWINGS

Preferred exemplary embodiments of the invention are illustrated in the drawings and are explained in greater detail in the following description, where the same, similar, or functionally equivalent components are designated by the same reference numbers.

In schematic fashion.

DETAILED DESCRIPTION OF THE PREFERRED EMBODIMENTS

Figures 1, 2:
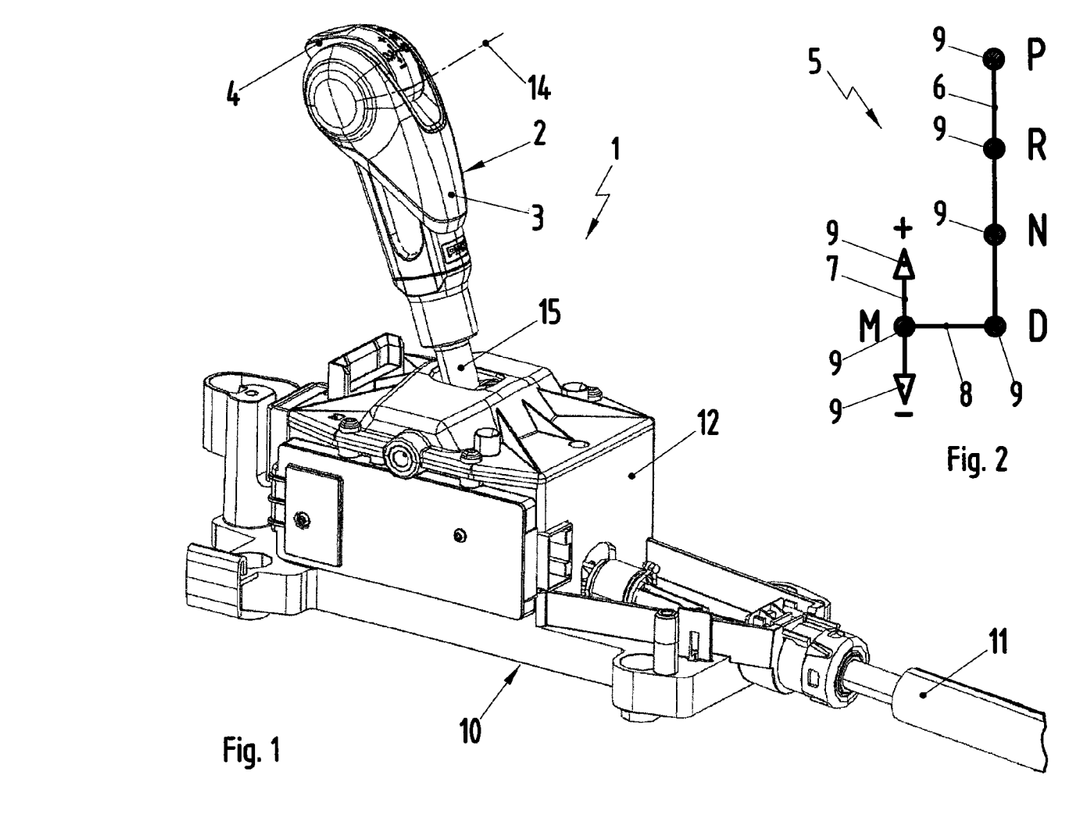
FIG. 1 shows a perspective view of a selector device.
FIG. 2 shows a schematic top view of a shifting gate.

As shown in FIG. 1, an inventive shifting device 1, which is used in conjunction with an automatic transmission of a motor vehicle, comprises a gear-shift lever 2, which comprises a hand grip 3. A release button 4, which, in this example, is integrated into the hand grip 3, is also provided on the gear-shift lever 2. The gear-shift lever 2 can be moved in a shift gate 5, a simplified view of which is shown in FIG. 2. The shift gate 5 comprises an automatic shift track 6, a manual shift track 7, and a transverse track 8 The gear-shift lever 2 can be moved in the automatic shift track 6 and in the manual shift track 7 to select gear-shift positions 9. For example, the automatic shift track 6 comprises the following gear-gear-shift positions: Park P, Reverse R, Neutral N, and Drive D. In contrast, the manual shift track 7 comprises, for example, a Middle M position, an upshift position +, and a downshift position −. The transverse shift track 8 allows the gear-shift lever 2 to be moved between the automatic shift track 6 and the manual shift track 7.

The shift gate 5 shown in FIG. 2 therefore has one-dimensional shift tracks 6, 7, 8, in which the gear-shift lever 2 can be moved only in the longitudinal direction in the automatic shift track 6 and in the manual shift track and only in the transverse direction in the transverse shift track 8.

To realize the shift gate 5, the gear-shift lever 2 according to FIG. 1 is supported on a bearing block 10 or a shift block 10 or a selector block 10. An actuating cable 11, which leads to the automatic transmission (not shown), extends out from the bearing block 10 and can be actuated on the shift block 10 by the gear-shift lever 2. The automatic transmission is preferably a dual-clutch automatic transmission. In particular, it can be a seven-gear automatic transmission. The motor vehicle in which the shifting device 1 shown here is preferably used is a sports vehicle and/or a vehicle with a rear-mounted engine.

The shift block 10 has a housing 12, which is at least partially omitted in FIGS. 3-9 so that the internal structure of the shifting device 1 can be explained in greater detail.

Figure 3:
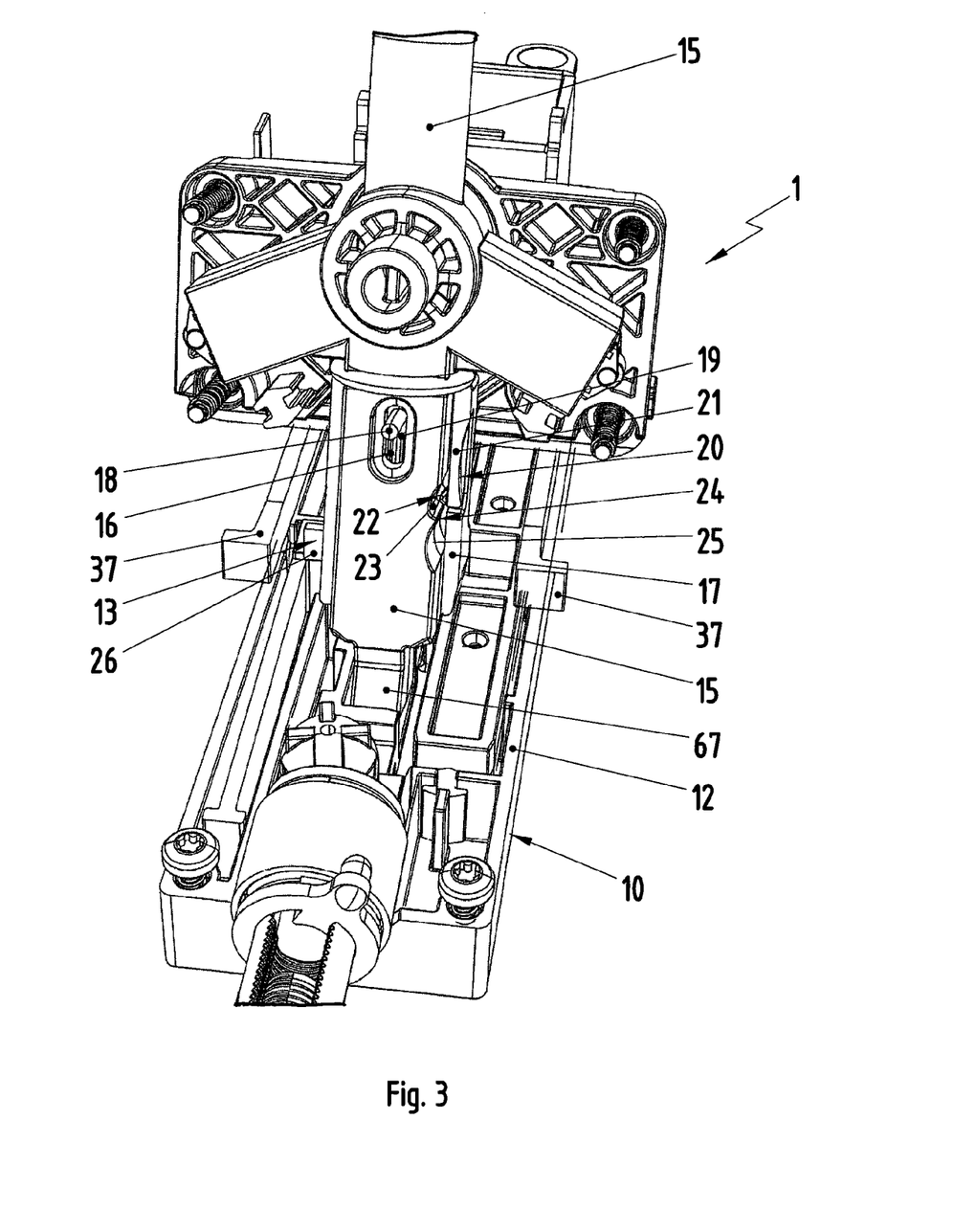
FIGS. 3-9 show perspective, partially cut-away views of the shifting device from different angles and in different cross sections.
Figure 4:
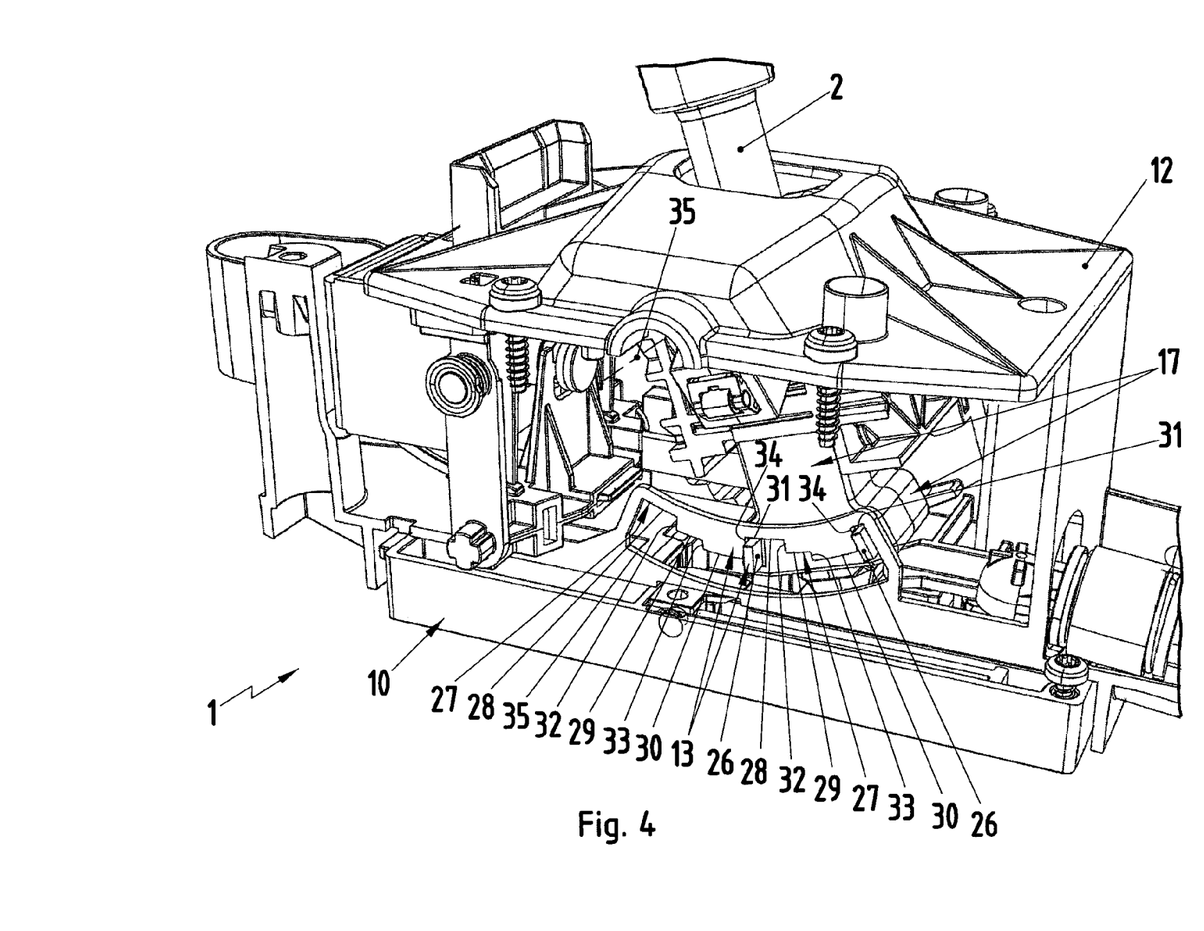

The shifting device 1 comprises a locking mechanism 13, at least part of which can be seen in, for example, FIGS. 3 and 4. This locking mechanism 13 can be switched at least between a locked state and a released state. The previously mentioned release button 4 cooperates with the locking mechanism 13. In particular, the release button 4 forms a component of the locking mechanism 13. By means of the release button 4, the state of the locking mechanism 13 can be changed. In the locked state, the locking mechanism 13 prevents the gear-shift lever 2 from being moved into the Park P and Reverse R positions. In addition, when in the locked state, it blocks the movement of the gear-shift lever 2 out of the Park P position. The locking mechanism 13, when in its locked state, can basically allow the movement of the gear-shift lever 2 out of the Reverse R, Neutral N, and Drive D positions. When in the locked state, it can also allow a changeover between the shift tracks 6, 7. When in the locked state, it can also be moved freely in the manual shift track 7 between the Middle M position, the upshift position +, and the downshift position −. In its released state, the locking mechanism 2 also makes it possible for the gear-shift lever 2 to be moved into and out of the Park P position. Thus the gear-shift lever 2, when in the released state in the automatic shift track 6, can be moved freely between the individual gear-shift positions of the automatic shift track 6, i.e., between the Park P, Reverse R, Neutral N, and Drive D positions.

The locking mechanism 13 is also designed so that can be converted into a partially released state. In this partially released state, the gear-shift lever 2 can be moved not only into the possible gear-shift positions allowed by the locked state but also into and out of the Reverse R position. In contrast to the released state, the gear-shift lever 2, when in this partially released state, cannot be moved into or out of the Park P position. This means that the movement of the gear-shift lever 2 in the automatic shift track 6 into the Park P position and out of that position is blocked when the partially released state is active. The partially released state therefore makes it possible for the driver to shift between the Reverse R and Drive D positions without the danger that he could shift into the Park P position by mistake; in particular, this partially released state makes it possible for the driver to accomplish this shifting without the need for visual confirmation that he is shifting correctly. This partially released state is therefore especially suitable for maneuvering operations of the vehicle.

To realize this partially released state, the release button 4 has two actuation positions. In a first actuation position, the locking mechanism 13 is converted to the partially released state. In a second actuation position, the locking mechanism 13 is converted into the released state. When the release button 4 is not actuated, the locking mechanism 13 is converted to the released state. It is especially advantageous here that the different states of the locking mechanism 13 can be set or changed by the use of only a single release button 4.

It is advisable for the release button 4 to be designed so that it realizes the two actuation positions in a manner which can be differentiated haptically, specifically on the basis of different actuating pressures and/or different actuation distances. Preferred here is an embodiment in which different actuating pressures lead to different actuation distances. For example, the release button 4 is preferably designed as a rocker button, which us supported so that it can be pivoted around a pivot axis 14 on the gear-shift lever 2 or grip 3. In the present example, the release button 4 is arranged on the grip 3 so that it is accessible from above and so that it can be actuated by the thumb of the hand grasping the hand grip 3 in an ergonomically favorable manner. To actuate the release button 4, the user uses his thumb to press the actuating button 4 downward. So that the different actuation states can be differentiated from each other, the actuating distance for setting the second actuation position is longer than the actuating distance for setting the first actuation position. In addition or alternatively, the actuating pressure for setting the second actuation position can also be greater than the actuating pressure for setting the first actuation position.

An ergonomically especially favorable actuation, which can be realized in an especially intuitive manner, can be achieved if the release button 4 can be moved out of its unactuated, resting position assigned to the locked state by pressing it down against an initial resistance. Said initial resistance forms a pressure stage, and when this is overcome, the release button 4 snaps into the first actuation position and then can be held there by pressing against a holding resistance. Said holding resistance is weaker than the initial resistance required to overcome the pressure stage. In other words, to reach the first actuation position, the user must exert a comparatively large amount of force to overcome the initial resistance and thus to actuate the release button 4. Then, to maintain the first actuation position, the user need exert only a comparatively weak holding force to compensate for the holding resistance.

So that the release button 4 can now be switched from its first actuation position into the second actuation position, it can be provided according to an effective design that, for this purpose, pressure must again be exerted against an actuation resistance which is greater than the holding resistance. In other words, to move from the first actuation position into the second actuation position, the user must press the release button 4 down harder than is necessary just to hold the release button 4 in the first actuation position. This configuration can be experienced and learned intuitively.

It is advisable for realizing the second actuation position to provide a stop, which limits the movement or pivot path of the release button 4. Optionally, the actuation resistance which must be overcome to reach the second actuation position can be at least as strong as the initial resistance which must be overcome to reach the first actuation position. As a result, the two actuation positions differ not only on the basis of the different actuation distances but also on the basis of the different actuating pressures or actuating forces.

So that the kinematics for the release button 2 presented here can be realized, the gear-shift lever 2 comprises a tubular body 15, in which a pushrod 16, visible in FIG. 3, is supported with freedom to move up and down. A drive connection is established between the release button 4 and the pushrod 16, so that actuation of the release button 4 generates a corresponding stroke of the pushrod 16. A slide 17, which can also move up and down, is also arranged on the tubular body 15. This slide coaxially surrounds the tubular body 15. A drive connection is established between the pushrod 16 and this slide 17, so that a stroke of the pushrod 16 generates a stroke of the slide 17. For example, the connection between the pushrod 16 and the slide 17 can be established by means of at least one pin 18, which is permanently attached to the pushrod 16 and which passes through a slot 19, formed in the tubular body 15, and which positively engages in a corresponding opening in the slide 17. The slot 19 is oriented in the direction in which the push rod 15 and the slide 17 move, that is, in the longitudinal direction of the tubular body 15. Between the slide 17 and the tubular body 15 there is also a latch 20, which serves to realize the initial resistance or pressure stage. For this purpose, the latch 20 comprises, for example, an elastic latching element 21, which is permanently connected to the slide 17. The latching element 21 comprises a latching projection 22, which engages in a latching contour 23. Said latching contour 23 is formed on the tubular body 15. The latching contour 23 comprises a latching edge 24, on which the latching projection 22 rests in the downward-oriented actuating direction of the release button 4. When the release button 4 is actuated, the latching element 21 is displaced outward by the sliding of the latching projection 22 along the latching contour 23, namely, displaced against the resistance of the latching element 21. As soon as the latching projection 23 reaches the other side of the latching edge 24, the initial resistance realized by means of the latch 20 decreases sharply. The latching projection 23 now engages in a second latching contour 25. The release button 4 is now in its first actuation position. The second latching contour 25 is flatter in design than the previously mentioned first latching contour 23. The pushrod 16 is advisably supported in the tubular body 15 by means of a compression spring (not shown), which makes an essential contribution to the actuation resistance of the release button 4. Until the pressure stage realized by means of the latch 20 is overcome, the actuation resistance of the release button 4 is formed by the restoring force of the previously mentioned spring and by the restoring force of the latching element 21. After the pressure stage is overcome, only the restoring force of the spring is present initially, because the latching projection 22 of the latching element 21 is engaged in the second latching contour 25. Only when the release button 4 is moved even farther can the latching element 21 be displaced outward again, so that it again can contribute to the actuation resistance.

The length of the slot 19 can be used, for example, to realize end stops to define the second actuation position of the release button 4 and also to define a rest position for the release button 4, which is present when the release button 4 is unactuated. The restoring force of the previously mentioned spring is strong enough in the first actuation position and necessarily also in the second actuation position to move the pushrod 16 along with the slide 17 automatically back to, and to pretension the release button 4 in, its rest position. In particular, the restoring force is thus sufficiently strong that the latching element 21 can travel past the latching edge 24.

The locking mechanism 13 comprises at least one blocking element 26, which is arranged on the gear-shift lever 2 with the freedom to move up and down, a drive connection being established between the release button 4 and this blocking element. The release button 4 and said locking mechanism 13 cooperate in such a way that actuation of the release button 4 generates a stroke of the blocking element 26. In the present example, the blocking element 26 is attached to the slide 17, which is connected to the release button 4 by the pushrod 16. As shown in FIG. 4, the locking mechanism 13 also comprises at least one arresting gate 27, which cooperates with the associated blocking element 26. The arresting gate 27 comprises several gate sections. In the present example, four gate sections are provided, namely, a first gate section 28, a second gate section 29, a third gate section 30, and a fourth gate section 31. The first gate section 28 is assigned to the two gear-shift positions Neutral N and Drive D. The second gate section 29 is assigned to the Reverse R position. The third gate section is not assigned to a gear-shift position and serves only to switch the gear-shift lever 2 over between the Reverse R and Park P positions. The fourth gate section 31 is accordingly assigned to the Park P position. The first gate section 28 is separated from the second gate section 29 by a first step 32. This first step 32 can be overcome by bringing the blocking element 26 into its first stroke position, which is assigned to the first actuation position of the release button 4. The second gate section 29 is separated from the third gate section 30 by a second step 33. This second step 33 can be overcome by bringing the blocking element 26 into its second stroke position, which is assigned to the second actuation position of the release button 4. In addition, the fourth gate section 31 is separated from the third gate section 30 by a third step 34. The third step 34 can also be overcome by bringing the blocking element 26 into its second stroke position, which is assigned to the second actuation position of the release button 4. The locking mechanism 13 works as follows. The locking mechanism 13 therefore serves to block switching movements of the gear-shift lever 2 into at least one gear-shift position 9 and/or out of at least one gear-shift position 9.

In FIG. 4, the locking mechanism 13 is in its locked state. In addition, the Park P position has been selected. The release button 4 is unactuated. So that it is possible now to pass from the fourth gate section 31 to the adjacent gate section 30, the release key 4 must be moved into its second actuation position, as a result of which the locking mechanism 13 assumes its released state. As a result, the blocking element 26 arrives in its second stroke position, which is sufficient to overcome the third step 34. The gear-shift lever 2 can now be pivoted, namely, around a transverse axis 35. As a result, the blocking element 26 arrives in the third gate section 30. From here, the gear-shift lever 2 can be moved as desired either into the Reverse R position, i.e., into the second gate section 29, or back again into the Park P position, i.e., back into the fourth gate section 31. The release button 4 does not have to be actuated again to accomplish this. When moved into the second gate section 29, the blocking element 26 springs back into its first stroke position, the release button 4 remaining unactuated at this point. Without actuation of the release button 4, the gear-shift lever 2 can no longer be moved back into the Park P position, because for this purpose it is necessary to overcome the second step 33. In contrast, without actuation of the release button 4, it is possible to shift into the Neutral N position and the Drive D position. As soon as the blocking element 26 engages in the first gate section 28, it springs back into its starting position. Without actuation of the release button 4, the gear-shift lever 2 can now be shifted only between the Neutral N position and the Drive D position. So that it can move back into the Reverse R position again, the step 32 must first be overcome. For this purpose, the release button 4 must be moved into its first actuation position to bring about the partial release of the locking mechanism 13. Said partially released state, however, is not sufficient to overcome the second step 33 as well, which means that, in the partially released state, the gear-shift lever 2 cannot be moved into the Park P position. Only by actuating the release button 4 in such a way that the release button 4 is moved into its second actuation position can the blocking element 26 overcome the second step 33. The locking mechanism 13 is now completely released, and the gear-shift lever 2 can be moved directly into the Park P position and back out of it again.

Figure 5:
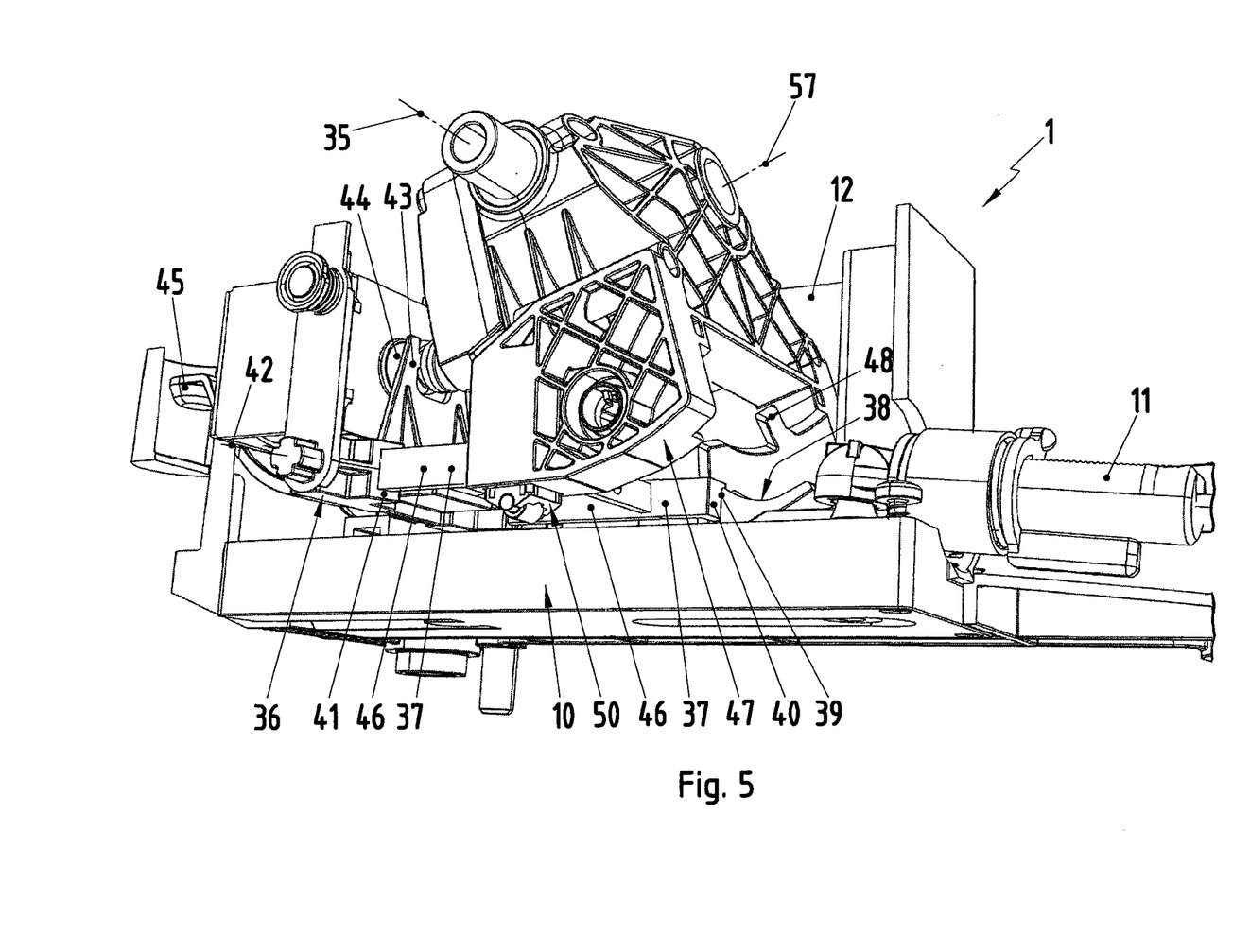

The locking mechanism 13 therefore serves to block switching movements of the gear-shift lever 2 into at least one gear-shift position 9 and/or out of at least one gear-shift position 9. Simultaneously, the release button 4 on the gear-shift lever 2 serves to release the blocking action of the locking mechanism 13. As shown in FIG. 5, two blocking elements 26 are arranged simultaneously on the gear-shift lever 2 with freedom to move up and down. The two blocking elements 26 are arranged in redundant fashion. The two blocking elements 26 are attached to the slide 17, a drive connection being established between the release button 4 and this slide by the pushrod 16. Accordingly, the two blocking elements 26 can be moved up and down synchronously by actuation of the release button 4. Each of the two blocking elements 26 interacts with an arresting gate 27. In the example, two arresting gates 27 are provided for this purpose, wherein each of the two blocking elements 26 cooperates with one of these arresting gates 27. The embodiment shown here, in which the two arresting gates 27 are formed in a common component 35, is especially advisable. The two arresting gates 27 are arranged in such a way that they merge continuously with each other. This is especially evident in the middle area, in which the first gate section 28 of the arresting gate 27 shown on the right merges seamlessly or continuously with the fourth gate section 31 of the arresting gate 27 shown on the left. The two blocking elements 26 are thus advisably arranged on the same side of the gear-shift lever 2. As a result, the redundancy can be realized in an especially compact manner.

The shifting device 1 is also equipped with a blocking mechanism 36, which can be seen especially clearly in FIG. 5. The blocking mechanism 36 serves to block the gear-shift lever 2 in the Park P position. For this purpose, the blocking mechanism 36 comprises two blocking elements 37, which are arranged in redundant fashion. Each blocking element 37 cooperates with a blocking gate 38. The blocking gate 38 comprises a gate section 39, which is assigned to the Park P position. When the gear-shift lever 2 is in the Park P position, the blocking element 37 engages in this gate section 39. In the present example, the blocking element 37 has for this purpose an angled terminal section 40, which cooperates with the associated gate 38. For this purpose, the terminal section 40 engages positively in the blocking gate 38, i.e., in the gate section 39.

The two blocking elements 37 are formed on a common blocking lever 41. This blocking lever 41 is supported pivotably around a pivot axis 42 and comprises an actuating arm 43, a drive connection being established between this arm and an actuator 44. The blocking lever 41 in the embodiment shown here also comprises an emergency actuation lever 45, which, in the event that the actuator 44 fails, can be actuated manually to move the blocking elements 37 out of their blocking position.

The blocking lever 41 comprises two blocking arms 46, each of which, in the present example, forms one of the blocking elements 37. To the extent that the blocking elements 37 are reduced to the angled terminal sections 40 at the ends of the blocking arms 46, the blocking arms 46 themselves comprise the blocking elements 37, namely, the terminal sections 40.

In the present example, one of the two blocking elements 37 is arranged on one side of the gear-shift lever 2, the other on the other side. As a result, the gear-shift lever 2 is supported symmetrically and without torque in the Park P position. It is also advisable to provide two separate blocking gates 38, only one of which is shown in FIG. 5. The two blocking gates 38 are formed on a mounting bracket 47, by means of which the gear-shift lever 2 is supported on the housing 12 pivotably around the pivot axis 35. Each of the blocking elements 37 cooperates with one of the blocking gates 38.

In the embodiment shown here, each of the blocking gates 38 is also equipped with an additional gate section 48, which is assigned to the Neutral N position. The blocking element 37 cooperates in the Neutral N position with this additional gate section 48 and can engage therein to block the gear-shift lever 2. An embodiment is especially effective in which, when the Park P position is present and the actuator 44 has not been actuated, the blocking element 37 engages in its assigned gate section 39 to block the gear-shift lever 2 in this Park P position. The two gate sections 39, 48 are arranged opposite each other in the blocking gate 38. As a result, when the Neutral N position is present, the blocking element 37 engages in its assigned gate section 48 only when the actuator 44 is actuated and only then blocks the gear-shift lever 2 in this Neutral N position.

The blocking of the gear-shift lever 2 in the Park P position or in the Neutral N position is frequently also called the "shift lock". It is clear that the shifting device 1 can be connected suitably to an ignition lock to allow the removal of the ignition key from the ignition lock only when the gear-shift lever 2 is in the Park P position and blocked by the blocking mechanism 36, i.e., the so-called "key lock".

Figure 6:
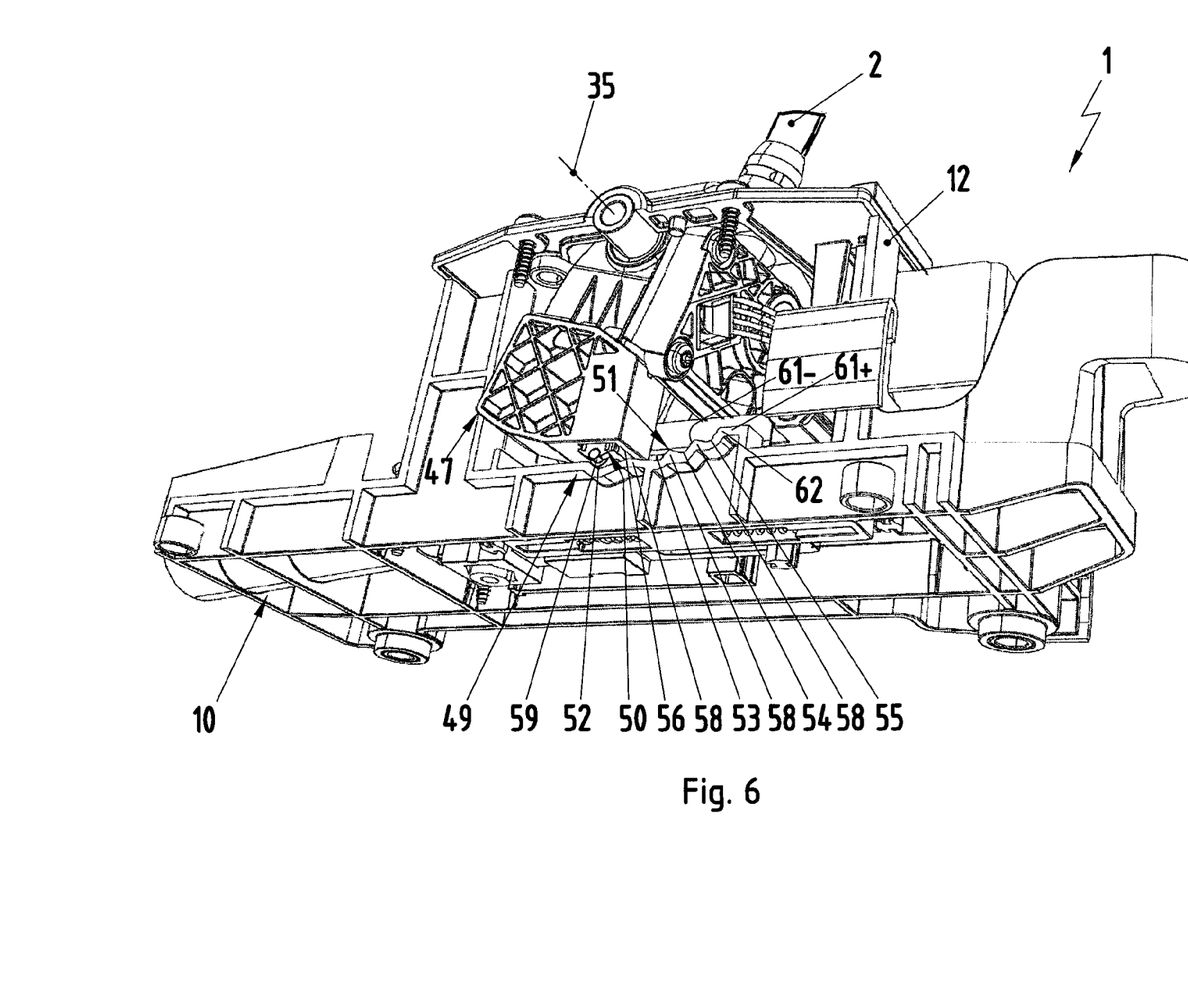

The shifting device 1 is also equipped with a latching mechanism 49, which can be seen especially clearly in FIG. 6. The latching mechanism 49 comprises the latching positions assigned to the gear-shift positions 9 of the gear-shift lever 2. For this purpose, the latching mechanism 49 comprises at least one latching element 50, which cooperates with a latching gate 51. Said latching gate 51 comprises several gate sections. Each of these is assigned to a gear-shift position. Accordingly, four gate sections can be seen here, namely, a first gate section 52, which is assigned to the Park P position, a second gate section 53, which is assigned to the Reverse R position, a third gate section 54, which is assigned to the Neutral N position, and a fourth gate section 55, which is assigned to the Drive D position. The latching gate 51 is designed so that each of its gate sections 52-55 forms a stable latching position for the latching element 50 in each of the assigned shift positions 9. The latching element 50 is pretensioned by the force of a spring into these stable latching positions. In addition, the latching element 50 can be moved out of these stable latching positions against the force of the spring. An embodiment is especially effective in which the latching mechanism 49 comprises two such latching elements 50, each of which cooperates simultaneously with its assigned latching gate 51. The second latching element 50 can be seen in FIG. 5, for example. One of the two latching elements 50 is thus located on one side of the gear-shift lever 2, the other on the other side, as a result of which symmetric and torque-free support of the gear-shift lever can be realized. Accordingly, two latching gates 51 are also provided.

The latching element 50 in question is arranged in a guide 56 so that is free to move up and down. Said guide 56 is open toward the associated latching gate 51, so that the latching element 50 in question can project out of the guide 56 under the force of a spring and engage in the latching gate 51. An appropriate compression spring inside the guide 56 can be supported on the latching element 50.

In the example, the latching elements 50 are arranged on the gear-shift lever 2, namely, in particular together with their associated guides 56. For this purpose, the gear-shift lever 2 is equipped here with a mounting bracket 47, by which the gear-shift lever 2 is supported pivotably around the pivot axis 35. This pivot axis 35 extends transversely to the direction of movement of the gear-shift lever 2 in the automatic shift track 6 and can thus be referred to in the following as the "transverse axis" 35. The latching elements 50 are arranged here together with the guides 56 on this mounting bracket 47. In contrast, the latching gates 51 are formed on the housing 12 or on the shift block or selector block 10.

As shown in FIG. 5, the gear-shift lever 2 can be supported on the mounting bracket 47 pivotably around a longitudinal axis 57, which extends transversely to the transverse axis 35. The gear-shift lever 2 pivots around the longitudinal axis 57 when it moves in the transverse axis 8 between the two shift tracks 6, 7.

Each latching gate 51 has transition sections 58 between the gate sections 52-55 assigned to the individual gear-shift positions 9; these transition sections are in the form of "hills" on the side facing the latching element 50, whereas the gate sections 52-55 adjacent thereto are in the form of "valleys". The latching gate 51 is adapted to its associated latching element 50 in such a way that the transition areas 58 form unstable transition points, from which the active spring forces automatically drive the gear-shift lever 2 into the one or the other adjacent stable latching position, each of which corresponds to one of the gear-shift positions 9. As a result, the gear-shift lever 2 can be actuated in a highly convenient manner to select the various gear-shift positions 9 of the automatic shift track 6.

The latching gate 51 in question, furthermore, can be designed in such a way and can cooperate with its associated latching element 50 in such a way that the Middle M position in the manual shift track 7 is a self-centering, stable gear-shift position. The gate section 55, which forms a stable latching position for the Drive D position, is also assigned to the Middle M position. Accordingly the Middle M position, too, is self-centering and stable.

The latching element 50 has here a roller element 59, which is in contact with the contour of the associated latching gate 51. The rolling element 59 has comparatively low resistance, which makes it easy to shift, i.e., to actuate the gear-shift lever 2, even at high retaining forces.

Figure 7:
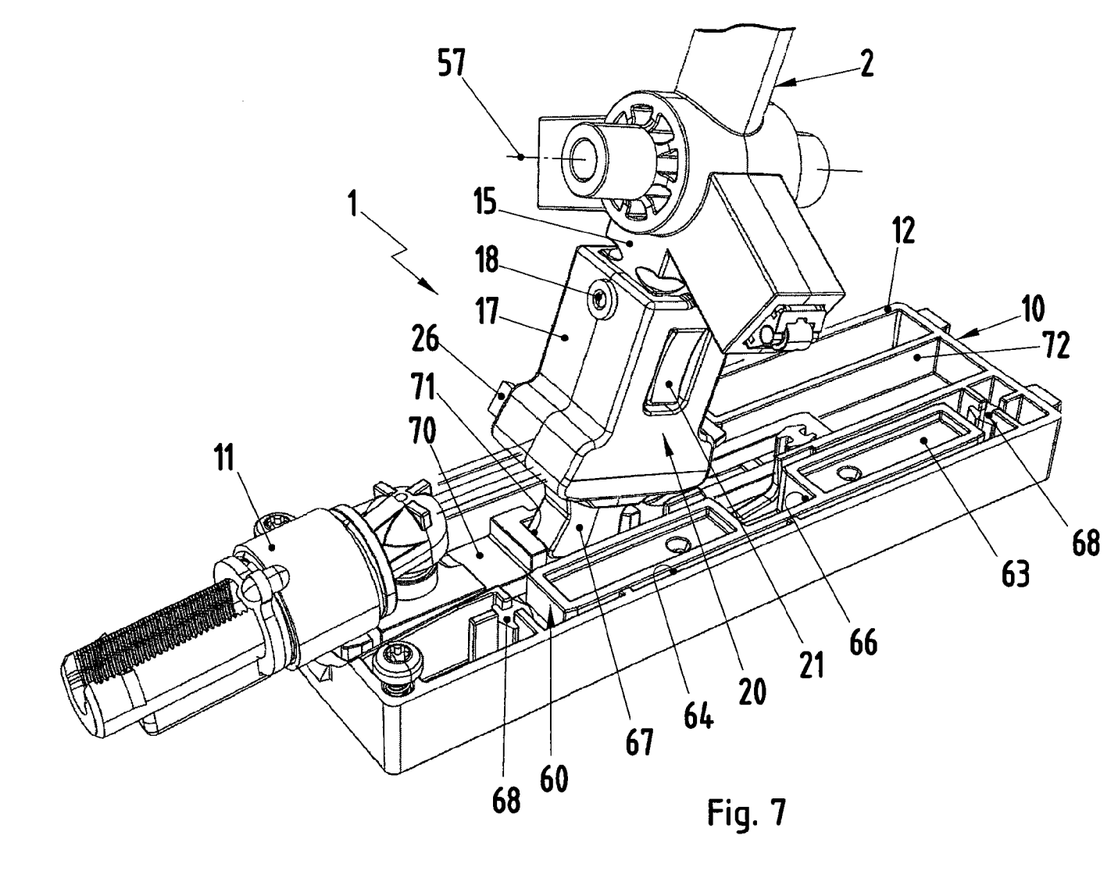
Figure 8:
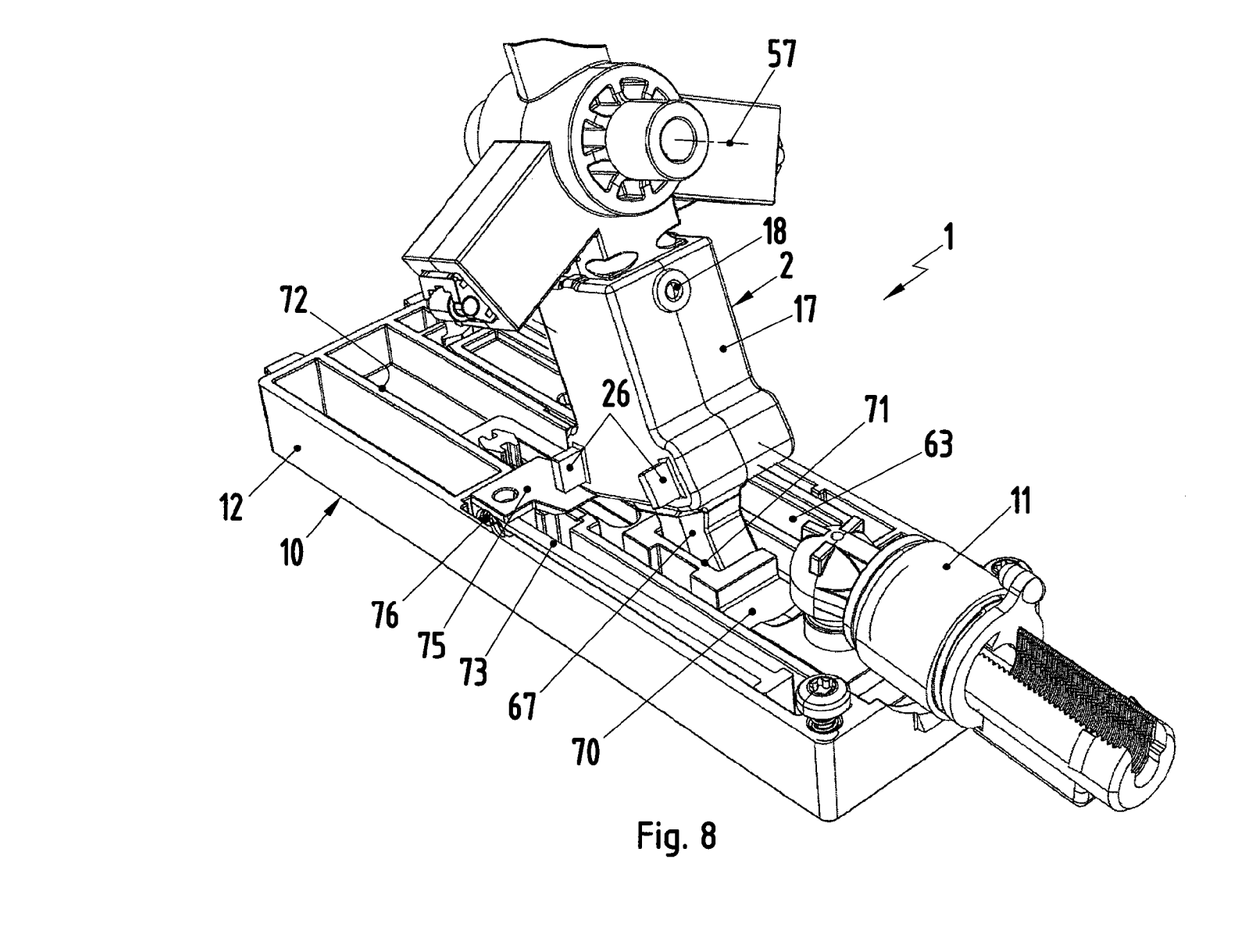
Figure 9:
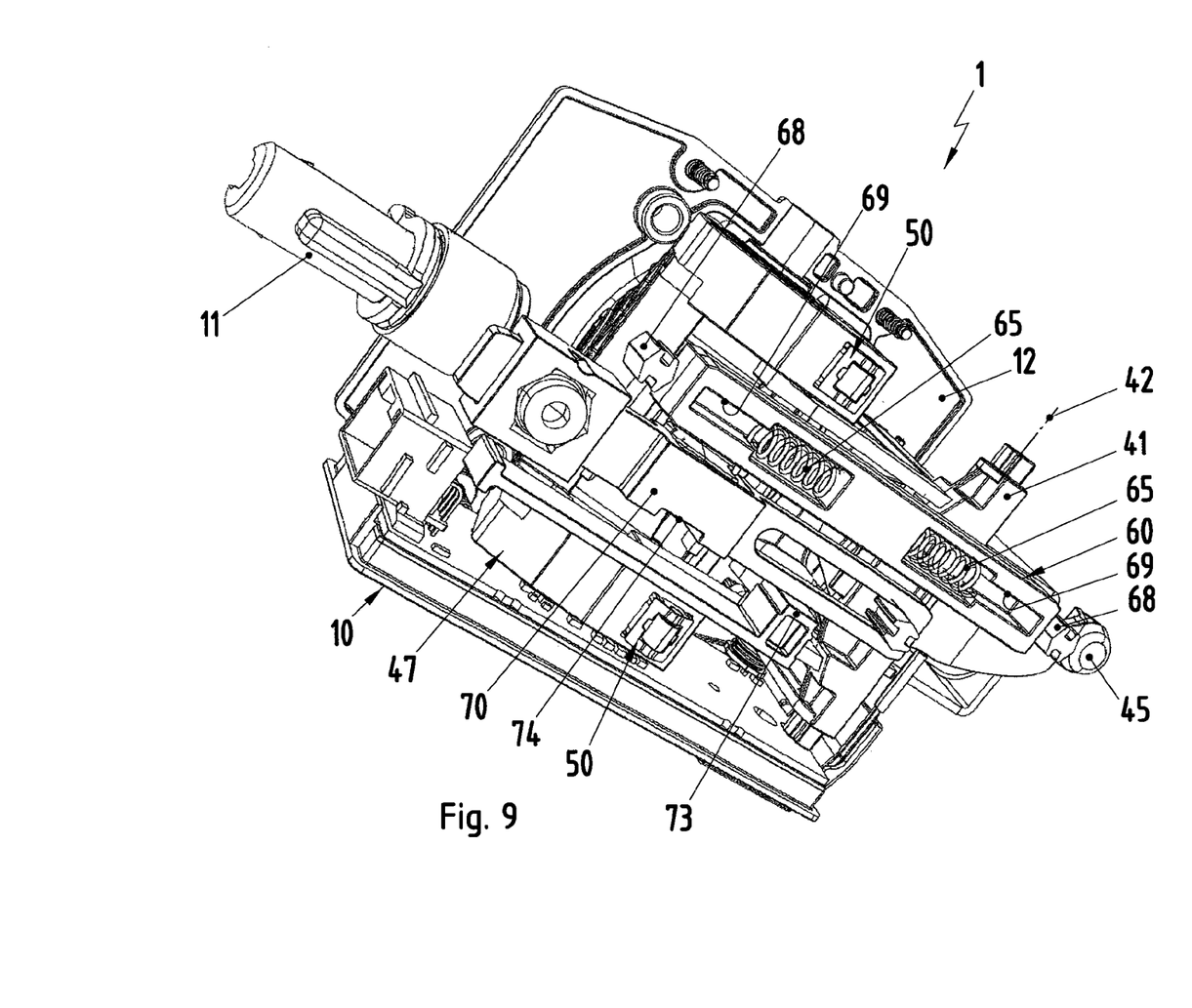

As shown in FIGS. 7-9, the shifting device 1 also comprises a centering mechanism 60. This centering mechanism 60 pretensions the gear-shift lever 2 in the manual shift track 7 into the Middle M position with a centering action. In addition, the centering mechanism 60 is designed so that, when the gear-shift lever 2 is in the manual shift track 7, it can be moved out of the Middle M position, i.e., into the upshift position + or into the downshift position −, only against a restoring force. The gear-shift lever 2 can be connected to said centering device 60 by moving it along the transverse track into the manual shift track 7. By moving the gear-shift lever 2 from the manual shift track 7 via the transverse track 8 into the automatic shift track, the gear-shift lever 2 is disconnected from the centering mechanism 60. Accordingly, the centering mechanism 60 can transmit forces to the gear-shift lever 2 only when this lever is moved into the manual shift track 7. In contrast, the latching mechanism 49 can transmit forces to the gear-shift lever 2 regardless of whether the lever is in the automatic shift track 6 or in the manual shift track 7. This means that the latching mechanism 49 is connected to the gear-shift lever 2 both in the automatic shift track 6 and in the manual shift track 7.

According to FIG. 6, the latching mechanism 49 assigns one gear-shift lever position 61 to the upshift position + and another gear-shift lever position 61 to the downshift position −. In FIG. 6, these positions are designated 61+ and 61−. Relative to the stable latching position assigned to the Middle M position, which is assigned to the gate section 55 assigned to the Drive D position, each of these two gear-shift lever positions 61 is located on the far side of an unstable transition point 58, 62, away from which, and thus away from the stable latching position assigned to the Middle M position, the gear-shift lever 2 is driven by the spring force generated by the latching mechanism 49. In other words, when the latching element 50 reaches the upshift position + in the latching gate 51, it arrives in a gear-shift lever position 61+ which, in FIG. 6, is located to the right of the unstable transition point 62, which, in FIG. 6, is located to the right of the gate section 55 assigned to the Middle M position or to the Drive D position. This means that the spring force which drives the latching element 50 out of its guide 56 drives the gear-shift lever 2 away from the said gate section 55. A corresponding situation applies also to the downshift position −. In this downshift position −, the latching element 50 is located in the gear-shift lever position 61−, which, in FIG. 6, is located to the left of the transition point 58, which is adjacent to (in FIG. 6 to the left of) the gate section 55 assigned to the Drive D and Neutral N positions. This means that, in this gear-shift lever position 61− as well, that is, in the downshift position 61−, the spring force acting on the latching element 50 drives the latching element 50 away from said gate section 55 and pushes it into the adjacent gate section 54.

This special design brings about a significant change in the force acting on the gear-shift lever 2 when this lever reaches the upshift position + or the downshift position −. For, once the unstable transition point 58 or 62 is passed, the direction in which the spring force of the latching mechanism 49 acts reverses. This means in turn that the force which the driver must exert to drive the gear-shift lever 2 into the upshift position + or into the downshift position − decreases significantly as soon as the position in question is reached or immediately before the position in question is reached.

In accordance with an especially advantageous embodiment, the centering mechanism 60 can now be adapted to the latching mechanism 49 in such a way that the restoring force of the centering mechanism 60 in the upshift position + and in the downshift position − is greater in each case than the spring force of the latching mechanism 49 acting in the opposite direction in the assigned gear-shift lever position 61. As a result of this design, the restoring force of the centering mechanism 60 can automatically bring the gear-shift lever 2 out of the upshift position + or the downshift position − into which it is pretensioned by the spring force of the latching mechanism 49 back into the Middle M position.

At least in FIGS. 7-9, the centering mechanism 60 comprises a pushrod 63. This is arranged with freedom of bidirectional movement in a rod guide 64. The rod guide 64 in the example is formed in the housing 12 or in the selector block 10. The pushrod 63 is pretensioned with a centering action by two restoring springs 65 into a central location assigned to the Middle M position. The pushrod 63 comprises a driver receptacle 66. At the end facing away from the grip 3, the gear-shift lever 2 has a driver 67, which, when the gear-shift lever 2 is moved into the manual shift track 7, engages in the driver receptacle 66. As a result, the gear-shift lever 2 is connected to the centering device 60.

The rod guide 64 and/or the pushrod 63 comprises endposition dampers 68. When the gear-shift lever 2 travels into the upshift position + and into the downshift position −, the end-position dampers 68 damp the arrival in the end position in question. For example, the pushrod 63 can be designed as a hollow body, which is suitable for accommodating the restoring springs 65. Support points, on which the restoring springs 65 can be supported on the rod guide 64, are formed on the housing 12 or on the selector block 10. They cannot be seen in the diagrams given here, however. These support points project into an open side of the push rod 63. Corresponding openings can be seen in FIG. 9, where they are designated by the number 69.

The shifting device 1 is also equipped with an actuating slide 70, which is provided for the operation of the actuating cable 11. For this purpose, the actuating cable 11 can be connected suitably to the actuating slide 70. The actuating slide 70 is also equipped with a driver receptacle 71, which is clearly visible in FIGS. 7 and 8. The driver 67 of the gear-shift lever 2 can engage in this driver receptacle 71 when the lever is moved into the automatic shift track 6. As a result, the gear-shift lever 2 is connected to the actuating slide 70 when the gear-shift lever 2 is moved into the automatic shift track 6. The actuating slide 70 can then be moved bidirectionally with the help of the gear-shift lever 2. For this purpose, a longitudinal guide 72 is also provided for the actuating slide 70. The longitudinal guide 72 is formed in the housing 12 or in the selector block 10.

In the Drive D position, the actuating slide 70 is positioned in its longitudinal guide 72 in such a way that its driver receptacle 71 is aligned with the driver receptacle 66 of the pushrod 63. When the gear-shift lever 2 is moved in the transverse track 8, the driver 67 therefore changes over from one of the two driver receptacles 66, 71 to the other. The shifting device 1 is also equipped with a locking element 73, which, when the driver 67 moves out of the driver receptacle 71 of the actuating slide 70, engages positively in a recess 74, which is formed in the actuating slide 70. The locking element 73 engaged in the recess 74 prevents the actuating slide 70 from being moved along the longitudinal guide 72. When the driver 67 is moved into the driver receptacle 71 of the actuating slide 70, the locking element 73 is pulled back out of the recess 74. This can be realized by means of, for example, an actuating element 75, which is connected to the locking element 73 and which is actuated or displaced by the driver 67 when the driver engages in the driver receptacle 71 of the actuating slide 70. So that the locking element 73 engages in the recess 74 when the driver 67 travels out of driver receptacle 71 of the actuating slide 70, a compression spring 76 can also be provided, which pretensions the locking element 73 in the direction toward the actuating slide 70.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A shifting device for an automatic transmission of a motor vehicle comprising:
   a gear-shift lever which can be moved in an automatic shift track to select gear-shift positions;
   a locking mechanism for blocking adjusting movements of the gear-shift lever into at least one of the gear-shift positions and/or out of at least one of the gear-shift positions;
   a release button arranged on the gear-shift lever to release the blocking action of the locking mechanism;
   a drive connection established between the release button and two blocking elements of the gear-shift lever which are arranged redundantly on the gear-shift lever with the freedom to move up and down such that an actuation of the release button produces a synchronous stroke of the two blocking elements of the gear shift lever,
   wherein each of the blocking elements of the gear-shift lever cooperates with one of two arresting gates, each arresting gate comprising gate sections assigned to the gear-shift positions, wherein the two arresting gates are formed as a common component in such a way that the gate sections of the two arresting gates merge continuously with each other; and
   a blocking mechanism for blocking the gear-shift lever in a Park position, said blocking mechanism comprising two redundantly arranged blocking elements, each blocking element of the blocking mechanism cooperating with one of two blocking gates, each blocking gate comprising a gate section assigned to the Park position such that when the Park position is present, the blocking elements of the blocking mechanism are aligned with the gate sections assigned to the Park position and can engage therein to produce a blocking effect.

2. The shifting device according to claim, wherein the two blocking elements of the gear-shift lever are arranged on the same side of the gear-shift lever.

3. The shifting device according to claim 1, wherein the two blocking elements of the gear-shift lever are formed on, and attached to, a slide, which is mounted on a tubular body of the gear-shift lever with freedom to move up and down, a drive connection being established between the release button and the slide by a pushrod arranged in the tubular body with freedom to move up and down.

4. The shifting device according to claim 1, wherein the blocking elements of the blocking mechanism are formed on or attached to a blocking lever, which is mounted with freedom to pivot around a pivot axis, said blocking lever comprising an actuating arm, a drive connection being established between the actuating arm and an actuator.

5. The shifting device according to claim 4, wherein the blocking lever comprises two blocking arms, each of which forms or comprises one of the blocking elements of the blocking mechanism.

6. The shifting device according to claim 1, wherein one of the two blocking elements of the blocking mechanism is arranged on one side of the gear-shift lever, and the other blocking element of the blocking mechanism is arranged on an opposite side of the gear-shift lever.

7. The shifting device according to claim 1, wherein the two blocking gates are separate, and wherein each of the two blocking elements of the blocking mechanism cooperates with one of the two separate blocking gates.

8. The shifting device according to claim 7, wherein each blocking gate further comprises a gate section assigned to a Neutral position, wherein, when the Neutral position is present, the blocking elements of the blocking mechanism are aligned with the gate section assigned to the Neutral position and can engage therein to produce a blocking effect.

9. The shifting device according to claim 8, wherein when the Park position is present and the actuator is unactuated, the blocking elements of the blocking mechanism are engaged in the gate sections assigned to the Park position to block the gear-shift lever in the Park position, and, when the Neutral position is present and the actuator has been actuated, the blocking elements of the blocking mechanism are engaged in the gate sections assigned to the Neutral position to block the gear-shift lever in the Neutral position.

* * * * *